May 11, 1926.  
W. C. MASON  
AUTOMOBILE HEATER  
Filed Nov. 30, 1920  
1,583,846  
2 Sheets-Sheet 2
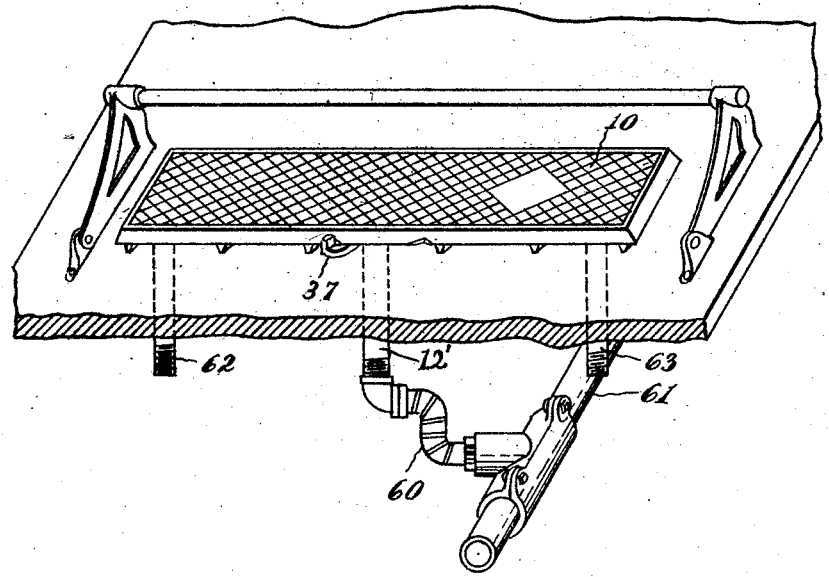

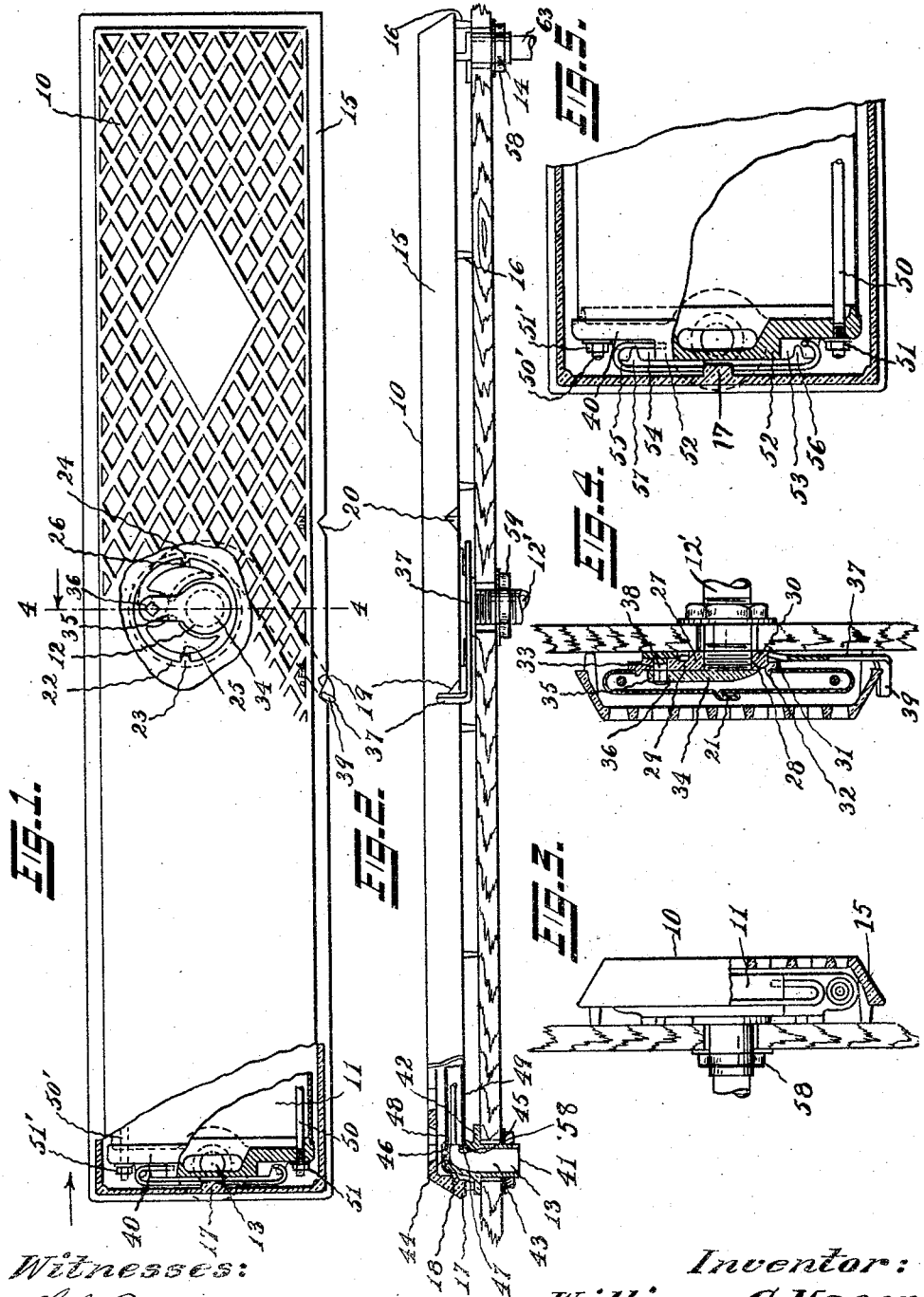

Patented May 11, 1926.

1,583,846

UNITED STATES PATENT OFFICE.

WILLIAM C. MASON, OF ALBANY, NEW YORK.

AUTOMOBILE HEATER.

Application filed November 30, 1920. Serial No. 427,403.

My present invention relates to heaters in which the heating element is exhaust gas from a motor or engine, one object of the invention being to provide a device for heating the interior of an automobile during the cold season, the exhaust gas from the engine being conducted through the heater and the heat generated thereby in the heater being distributed to the interior of the automobile.

Another object is to provide a heater for an automobile which is of simple parts and economical in construction, which is readily assembled and disassembled and installed, and which does not interfere with the operation of the engine, or impair or disfigure the body of the automobile.

One feature of my invention is that the heat inlet valve of the heater may be operated for opening or closing the same without necessity for the occupant of the automobile to rise or move from his seat, or in the case of the driver of the automobile to divert the use of his hands from the steering wheel.

Another feature is that the heating drum or pan of the heater has means for providing for expansion and contraction thereof.

In the accompanying drawings which form part of this specification, Figure 1 is a top or plan view of my heater, partly broken away to show details thereof.

Figure 2, is a side or edge view of my heater, partly in section, operatively connected to a vehicle.

Figure 3, is an end view partly in section looking in the direction of the left hand arrow of Fig. 1, the heater being operatively connected to a vehicle, and the view being on a larger scale than Figs. 1 and 2.

Figure 4, is a sectional view on the line 4—4 of Fig. 1, looking in the direction of the left-hand arrow of Fig. 1, the heater being operatively connected to a vehicle, and the view on said larger scale.

Figure 5, is a fragmentary top or plan view, partly broken away, of one end of the heater, and on larger scale than the other views.

Figure 6, is a perspective view of the heater operatively connected to a vehicle, the floor of the vehicle being fragmentary and partly in section.

Similar numerals refer to similar parts throughout the several views.

My heater comprises generally a foot grating 10, a heating drum or pan 11, a gas inlet-valve 12, and gas outlets 13 and 14.

The foot grating 10 preferably is of metal and of such size and shape, the shape preferably being oblong, as properly to cover or enclose the heating drum or pan and the adjacent cooperating parts of the device.

The foot grating 10, has a downwardly and outwardly projecting edge 15, which is provided with supporting legs 16, Fig. 2, intended to bear or rest upon the floor of the vehicle and which permit circulation of air through the grating from the under side thereof and around the heating drum or pan 11. The projecting edge 15 on its interior substantially in the middle of each end of the grating (only one such end being shown in the drawings) is provided with an inwardly extending lug 17, provided with a recess 18 therein, Fig. 2. The grating 10 is provided near the middle transverse line thereof on the front of the grating with two recesses 19 and 20, spaced apart, the purpose of the lug 17 and recess 18, 19 and 20 being later stated.

The heating drum or pan 11, as shown, comprises a sheet of suitable thin metal, foldably connected, or interfolded at the edges of the sheet, in the longitudinal line of the sheet as at 21, Fig. 4 to form a shallow drum or pan, the lower side of this drum or pan being cut out or punched out substantially at the middle of the lower side to provide a circular space or opening 22, having on the interior of the circumference oppositely disposed flat projections or lugs 23 and 24 intended to engage in recesses 25 and 26 in the valve seat 27.

The valve seat 27 has a threaded bore 28, so located as to provide adjacent to this bore a wide or extended portion 29 of the valve seat, and a narrower portion 30 thereof, the portions 29 and 30 being integral and having formed thereon an annular ledge 31, having an annular rib 32, the bottom side of the heating drum or pan 11 adjacent to the circular opening 22 being soldered or otherwise secured in gas tight manner to the ledge 31 and abutting the rib 32, the lugs 23 and 24 of the drum or pan engaging in the recesses 25 and 26 of the valve seat and thereby preventing the valve seat from working loose or turning in its connection with the drum or pan. The extended portion 29 of the valve seat has a round hole 33 therethrough the purpose of which is later stated.

The valve 34 is a metal plate of shape suitable to cover or close the gas inlet 12, the valve being flat to take up small space and not to obstruct the circulation of heat in the interior of the drum or pan, and being supported for oscillating movement. The valve 34 has an extended portion 35 which has a squared hole 36 therethrough arranged in registering relation with the round hole 33 of the valve seat 27. In Fig. 4, the valve is of exaggerated thickness for clearly showing its form and the arrangement of the round and squared holes 33 and 36.

An arm 37, which may be and preferably is of the curved shape shown by the dotted lines in Fig. 1, and which is shown in section in Fig. 4, is provided at its inner end with an upstanding lug 38, which has a round lower portion for engaging in the round hole 33 of the valve seat 27, and a squared upper portion for engaging in the squared hole 36 of the valve 34, the arm 37 pivoting in the round hole 33 by means of the round portion of the lug 38 for swinging movement, and by means of the engagement of the squared portion of the lug 38 in the squared hole 33 of the valve 34 correspondingly swinging the valve 34 to open or closed position, the squared end of the lug 38 being flattened or riveted over the valve 34 for securing the lug in the hole 33, or secured therein in other suitable manner. The arm 37 extends from its connection to the valve seat 27 to a point slightly outside of the edge 15 of the foot grating 10, when the parts are in operative relation in the heater, and at its outer end is provided with an upstanding lug or kick lug 39, which is arranged to engage, by swinging the arm, in the recesses 19 and 20 in the edge 15 of the foot grating.

The header or head-piece 40 is provided for closing the end of the drum or pan 11, a corresponding header, not shown, being provided for closing the opposite end of the drum or pan.

The header 40, Fig. 2, is a casting comprising at each end thereof a vent end 41 passing through the floor of the automobile, an exterior circular boss 42 adjacent to the vent end 41 and intended to engage or contact with the upper side of the floor of the automobile, and a passageway 43 for connecting the interior of the drum or pan 10 with the vent end 41. The passageway 43 is formed by walls 44 and 45, the wall 44 forming one side of the passageway 43 and being extended to form a top or cover for the passageway, and the wall 45 forming the other side of the passageway and leaving between the walls 44 and 45 space for communication with the interior of the drum or pan. The extended or covering portion of the wall 44 is provided with a recess 46 and the wall 45 is provided with a recess 47. One sheet, as 48, of the drum or pan 11 is soldered or otherwise secured in gas tight manner to the face of the recess 46, and the other sheet, as 49, of the drum or pan is similarly secured to the face of the recess 47, passage for gas thus being afforded from the drum or pan 11 through the passageway 43 to the vent end 41 of the header.

The parallel rods 50, 50' connect the header 40 with the opposite header, not shown, a rod for each side of the headers, the rods being secured by suitable means such as the nuts 51, 51'.

The header 40, Fig. 5, has an outwardly extended rectangular portion 52 with flange ends 53 and 54, the side of the rectangular portion 52 adjacent to the flange end 54 being bored to receive one end of the grating clip 55 therein, and the side of the opposite end of the portion 52 being bored to receive the other end of the grating clip 55 therein, the arrangement being intended to permit the grating clip 55 to be sprung into the recess 18 of the lug 17 on the edge of the grating 10, for removably attaching the grating to the header 40, it being borne in mind that similar construction is provided for the header opposite to the header 40 and for the end of the grating 10 at the edge thereof opposite to the header 40. The recesses 56 and 57 are provided for receiving the heads of screws, not shown, for fastening the header to the floor of the automobile, if the weight of the heater is not considered sufficient to hold the bosses 42 in contact with the floor of the automobile, or a threaded nut such as 58 may be provided for the vent end 41, which nut engages or contacts with the under side of the floor of the vehicle and cooperating with the boss 42 secures the header to the floor. A threaded split nut, such as 59, Fig. 2, may be arranged to engage the gas inlet 12 for securing the valve seat 27 to the floor of the automobile if considered necessary.

The gas inlet 12' is connected by flexible means such as 60, Fig. 6, with the exhaust pipe 61 of the engine of the automobile at a point between the engine and the muffler, neither engine nor muffler being shown but the arrangement being well known and readily understood.

The gas exhausts 13 and 14 may be connected by means such as 62 and 63 to the exhaust pipe 61 at points between the flexible connecting means 60 and the muffler.

Having thus described my invention it should be understood that there may be modifications thereof and variations therein without departing from the spirit of the invention or exceeding the scope of the appended claims.

Having thus described my invention, I claim:

1. In a heater, a metal drum, means for passage of heating medium into the drum, and chambered head-pieces for the ends of the drum provided with means for passage of heating medium from the drum into the head-pieces and outlets located between the opposite ends of the head-pieces and communicating with the chambered space of the head-pieces for passage of heating medium therefrom.

2. In a heater, a heat radiating drum of thin metal sheets interfoldably secured together in gas tight relation at edges of the sheets, and head-pieces for the ends of the drum; the head-pieces being provided with vent means for heated gases and provided with means for securing the drum to the head-pieces and provided with means for passage of heated gases from the interior of the drum to said vent means of the head-pieces.

3. In a heater, a heat radiating drum of thin metal sheets of greater length than width interfoldably secured together in gas tight relation at edges of the sheets in the longitudinal line of the sheets, and head-pieces for the ends of the drum; the head-pieces being provided with vent means for heated gases and provided with means for securing the drum to the head-pieces and provided with means for passage of gases from the interior of the drum to said vent means of the head-pieces.

4. The combination with the exhaust means of an internal combustion engine, of a shallow heat radiating drum, head-pieces for the ends of the drum provided with vent means for heated gases, means for passage of heated gases from the interior of the drum to said vent means, means within the drum for permitting or preventing passage of heated gases into the drum, means cooperating between said means for permitting or preventing passage of heated gases and the exhaust means of the engine, means for operating said means for permitting or preventing passage of heated gases; and means cooperating with the vent means of the head-pieces for receiving heated gases therefrom for discharging the heated gases at points remote from the vent means; said means for permitting or preventing passage of heated gases into the drum taking up small space within the shallow drum and permitting circulation of heat in the interior of the drum unobstructed by said means.

5. The combination with the exhaust means of an internal combustion engine, said means including a muffler, of a shallow heat radiating drum, head-pieces for the drum provided with vent means for heated gases, means for passage of heated gases from the interior of the drum to said vent means, means within the drum for permitting or preventing passage of heated gases into the drum, means cooperating between said means for permitting or preventing passage of heated gases and said exhaust means and connected to the exhaust means inwardly of the connection of said muffler thereto, means for operating at a point outside of the drum said means for permitting or preventing passage of heated gases; and means cooperating with the vent means of the head-pieces for receiving heated gases therefrom, said means for permitting or preventing passage of heated gases into the drum taking up small space within the shallow drum and permitting circulation of heat in the interior of the drum unobstructed by said means.

6. In a heater, a heat radiating drum, a valve for introducing heating medium into the drum, a covering member for the drum providing a foot rest, and means appurtenant to the covering member for operating the valve.

7. In a heater, a heat radiating drum consisting of metal sheets connected by head-pieces, a valve for introducing heating medium into the drum, a covering member for the drum and head-pieces and providing a foot-rest, and means appurtenant to the covering member for operating the valve.

8. In a heater, a shallow heat radiating drum operatively connected to means for supplying heat and having head-pieces, a flat oscillatable valve consisting of a plate pivoted to swing across said means within the shallow drum for permitting or preventing supply of heat to the drum, a foot-rest covering said drum and head-pieces, and means appurtenant to the foot-rest and extending beyond the confines of said foot-rest for operating said valve.

9. In a heater, a shallow heat radiating drum, means for inlet of heating medium to the interior of said drum from a source of supply, a valve seat in the heating drum having a valve opening communicating with said means for inlet and having a round aperture adjacent to said valve opening, a flat oscillatable valve for engaging said valve opening and having a squared aperture in alinement with said round aperture of the valve seat, and an arm having an upstanding lug provided with a round portion for engaging the round aperture of the valve seat and an adjoining squared portion for engaging the squared aperture of said valve for operating the valve by swinging the arm.

10. In a heater, a heat radiating drum, head-pieces for the ends of the drum, a foot-rest covering the drum and head-pieces, and pivotally movable resilient means cooperating between the head-pieces and the foot-rest for releasably securing the foot-rest to the head-pieces.

11. In a heater, a heat radiating drum, head-pieces for the ends of the drum, a foot-rest covering the drum and head-pieces, and springs pivotally connected to the head-pieces and engageable with the foot-rest for releasably securing the same to the head-pieces.

12. In a heater, a heat radiating drum, head-pieces for the ends of the drum, the drum being of greater length than width, a foot grating covering the drum and head-pieces, and springs pivotally connected to the head-pieces and engageable with the foot grating for releasably securing the same to the head-pieces.

WILLIAM C. MASON.